Feb. 10, 1925.
M. D. WILSON
1,525,708
BROACH
Filed Feb. 9, 1923
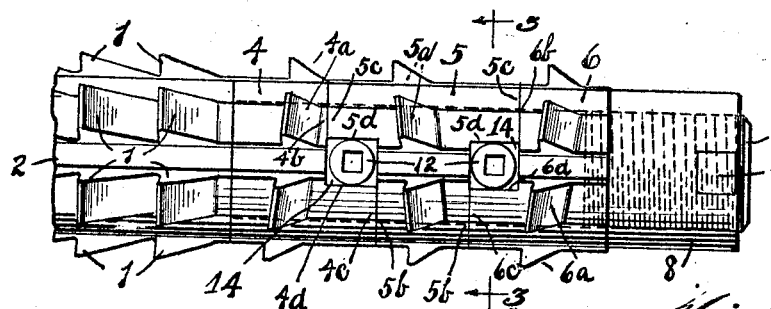
Fig. 1
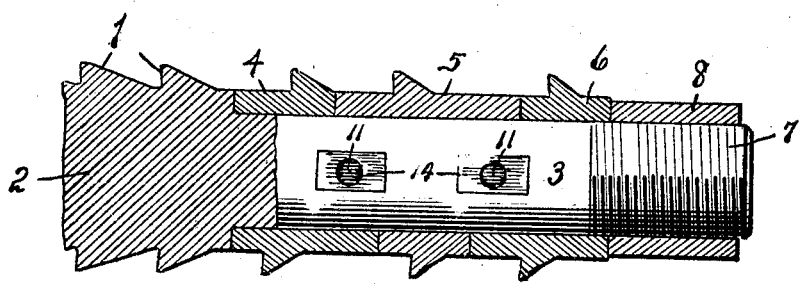
Fig. 2
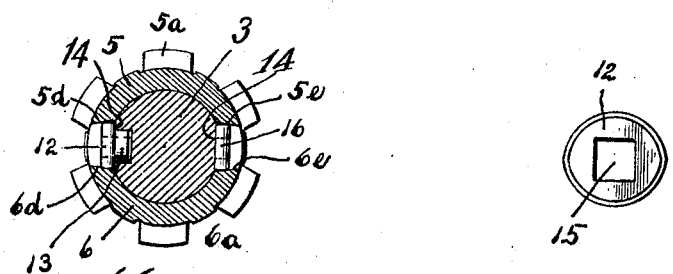
Fig. 3
Fig. 4
Inventor
Maurice D. Wilson
By Edward N. Pagelsen
Attorney Patented Feb. 10, 1925.

1,525,708

UNITED STATES PATENT OFFICE.

MAURICE D. WILSON, OF DETROIT, MICHIGAN.

BROACH.

Application filed February 9, 1923. Serial No. 618,129.

*To all whom it may concern:*

Be it known that I, MAURICE D. WILSON, a subject of the King of Great Britain, and residing at Detroit, in the county of Wayne and State of Michigan, have invented a new and Improved Broach, of which the following is a specification.

This invention relates to the construction of that class of metal-working tools which are used to form longitudinal grooves in the articles being worked by a single stroke or longitudinal movement of the tool, the tool being provided with one or more longitudinal rows of teeth increasing in dimensions so that each tooth of the row will contribute to the production of the groove to be formed in the work.

Tools of this character are usually employed to form a series of longitudinal grooves in the interior cylindrical surfaces or bores of gears and couplings to receive the splines formed on the shafts on which such members are longitudinally slidable. The corners and sides of the cutting teeth of such tools wear, thereby reducing their width so that the grooves formed thereby become narrower until the permitted variance, which is usually only a few thousanths of an inch, is soon exceeded. When this occurs the tool becomes usless for that particular line of work.

The object of the present invention is to provide one end of such tools with adjustable portions so that the teeth carried thereby can be moved laterally relative to the other teeth of the respective rows to which they belong so that the grooves formed by the teeth of each row will be of the desired width.

This invention therefore consists in a cutting tool embodying a main or body portion having one or more longitudinal rows of cutting teeth, a plurality of secondary or auxiliary members mounted thereon and each having one or more teeth for each row of teeth on the body of the tool, and means for varying the lateral adjustment of the teeth on the secondary members relative to the teeth on the main portion of the tool.

It further consists in a substantially cylindrical cutting tool embodying a body having longitudinal rows of cutting teeth and a reduced cylindrical portion, a plurality of collars rotatably mounted on the reduced portion of the main member and having cutting teeth so spaced circumferentially as to aline with the rows of teeth on the main member, means to rotate said collars on the main member relative to each other, and means to secure the collars in position.

It also consists in the details of construction illustrated in the accompanying drawing and particularly pointed out in the claims.

In the drawing, Fig. 1 is an elevation of one end of a broach embodying the present invention. Fig. 2 is a longitudinal section of a portion thereof and an elevation of the remainder. Fig. 3 is a section on the line 3—3 of Fig. 1. Fig. 4 is a plan of one of the adjusting devices.

Similar reference characters refer to like parts throughout the several views.

The drawing shows merely that end of the broach which finishes the grooves. Such tools are usually several feet long and are provided with longitudinal rows of teeth 1 integral with the body portion 2. The teeth usually increase in height and sometimes in width from the entering end to the finishing end, but as the present invention has to do only with the finishing end, the entering end is not shown.

The finishing end 3 of the body of the tool is turned down to receive the adjustable collars 4, 5 and 6, which are provided with teeth $4^a$, $5^a$, $6^a$ spaced circumferentially to normally aline with the several rows of teeth on the body 2 of the tool. These teeth on the collars are shown arranged spirally to take advantage of the peculiar cutting effect of teeth of this type, and if such teeth are used, the lead of the spirals is reversed on adjacent collars.

The end 7 of the reduced portion 3 is preferably threaded to receive the nut 8 which serves as an abutment for these collars. The two ends of the collar 5 and the ends of the collars 4 and 6 contacting therewith are formed with longitudinal extensions or steps and terminate in the transverse radial surfaces $4^b$ and $4^c$, $5^b$ and $5^c$ and $6^b$ and $6^c$ respectively. The transverse radial surface $b$ of each collar contacts with the transverse radial surface c of the adjacent collar. This collar may be formed with flats 9 to receive a wrench.

The transverse surfaces of these collars are connected by the longitudinal surfaces $4^d$, $4^e$, $5^d$, $5^e$, $6^d$ and $6^e$, and these surfaces of adjacent collars are spaced apart to admit the adjusting and locking devices. Adjacent longitudinal surfaces d and e may slope toward each other outwardly so as to hold the adjusting and locking devices in position. The adjusting devices consist of the elliptical heads 12 having cylindrical stems 13 adapted to closely fit in the cylindrical recesses 11 in the reduced portion 3 of the tool body. These heads may be formed with recesses 15 to receive proper tools. The locking members 16 are similar to the heads 12 but have no stems as they are intended to float. The part 3 of the broach is preferably formed with flats 14 on which the heads 12 and locking members 16 may rest.

When the parts are initially assembled, the teeth $4^a$, $5^a$ and $5^b$ are preferably of such dimensions that they will finish the grooves that are to be cut. But as their corners and sides wear, their width is reduced. The locking members 16 are then turned until their major axes are parallel to the axis of the tool and the adjusting heads 12 are turned to bring their major axes at an angle to the axis of the tool. This separates the surfaces $4^d$ and $5^d$ of the longitudinal extensions and the surfaces $5^d$ and $6^d$, while it causes the surfaces $5^e$ on the opposite side of the tool to approach the surfaces $4^e$ and $6^e$. The result is that the teeth $4^a$ and $6^a$ move circumferentially of the tool in one direction and the teeth $5^a$ move the same distance in the other direction and effectively increase the cutting width of the teeth of each longitudinal row which are attached to these collars. After the collars are adjusted the locking members are turned to force apart the surfaces e and thereby lock the collars in position.

It is evident that these collars can be made of high speed steel and will have long life and when worn out can be replaced at moderate cost. The length of these collars, their number and the other details of the construction of this broach can all be changed by those skilled in the art without departing from the spirit of my invention as set forth in the following claims.

I claim:—

1. In a cutting tool, the combination of a body having longitudinal rows of cutting teeth and a reduced cylindrical end, a plurality of collars rotatably mounted on the cylindrical end and having teeth normally in alinement with the teeth on the body of the tool, and means to rotate the collars on said body.

2. In a cutting tool, the combination of a body having longitudinal rows of cutting teeth and a reduced cylindrical end, a plurality of collars rotatably mounted on the cylindrical end and having teeth normally in alinement with the teeth on the body of the tool, and means to rotate the collars on said body relative to each other and to lock said collars from rotating.

3. In a cutting tool, the combination of a body having longitudinal rows of cutting teeth and a reduced cylindrical end, a plurality of collars rotatably mounted on said cylindrical end and having over-lapping longitudinal extensions and teeth normally in alinement with the teeth on the body, and adjusting members between the longitudinal extensions of adjacent collars adapted to rotate said collars on the body relative to each other.

4. In a cutting tool, the combination of a main body portion having a longitudinal row of cutting teeth, a plurality of auxiliary members mounted on the main body portion and having teeth normally in alinement with the teeth on the body portion, and means to move the auxiliary members on the main portion to carry the teeth on the auxiliary members laterally relative to the teeth on the body portion.

5. In a cutting tool, the combination of a main body portion having a longitudinal row of cutting teeth, a plurality of auxiliary members mounted on the main body portion and having teeth normally in alinement with the teeth on the body portion, and means to move the auxiliary members on the main portion to carry the teeth on the auxiliary members laterally relative to the teeth on the body portion, said adjusting means comprising elliptical and rotatable heads.

6. In a broach, the combination of a body having longitudinal rows of cutting teeth and a reduced cylindrical end, a plurality of collars rotatably mounted on the cylindrical end and having teeth normally in alinement with the teeth on the body of the broach, means to rotate the collars on said body, and an abutment secured on the end of said body to receive the thrust of the collars.

7. In a cutting tool, the combination of a body having longitudinal rows of cutting teeth and a reduced cylindrical end, a plurality of collars rotatably mounted on said cylindrical end and having overlapping longitudinal extensions and teeth normally in alinement with the teeth on the body, adjusting members between longitudinal extensions of adjacent collars adapted to rotate said collars on the body relative to each other, and means between other longitudinal extensions of adjacent collars to lock said collars in position.

8. In a cutting tool, the combination of a main body portion having a longitudinal row of cutting teeth, a plurality of auxiliary members mounted on the main body portion and having teeth normally in alinement with the teeth on the body portion, means to move the auxiliary members on the main body portion to carry the teeth on the auxiliary members laterally relative to the teeth on the body portion, and locking means to secure the auxiliary members in position on the main body portion, said adjusting and locking means comprising elliptical and rotatable heads adapted when rotated to move the teeth on the auxiliary members laterally in opposite directions.

MAURICE D. WILSON.